UNITED STATES PATENT OFFICE.

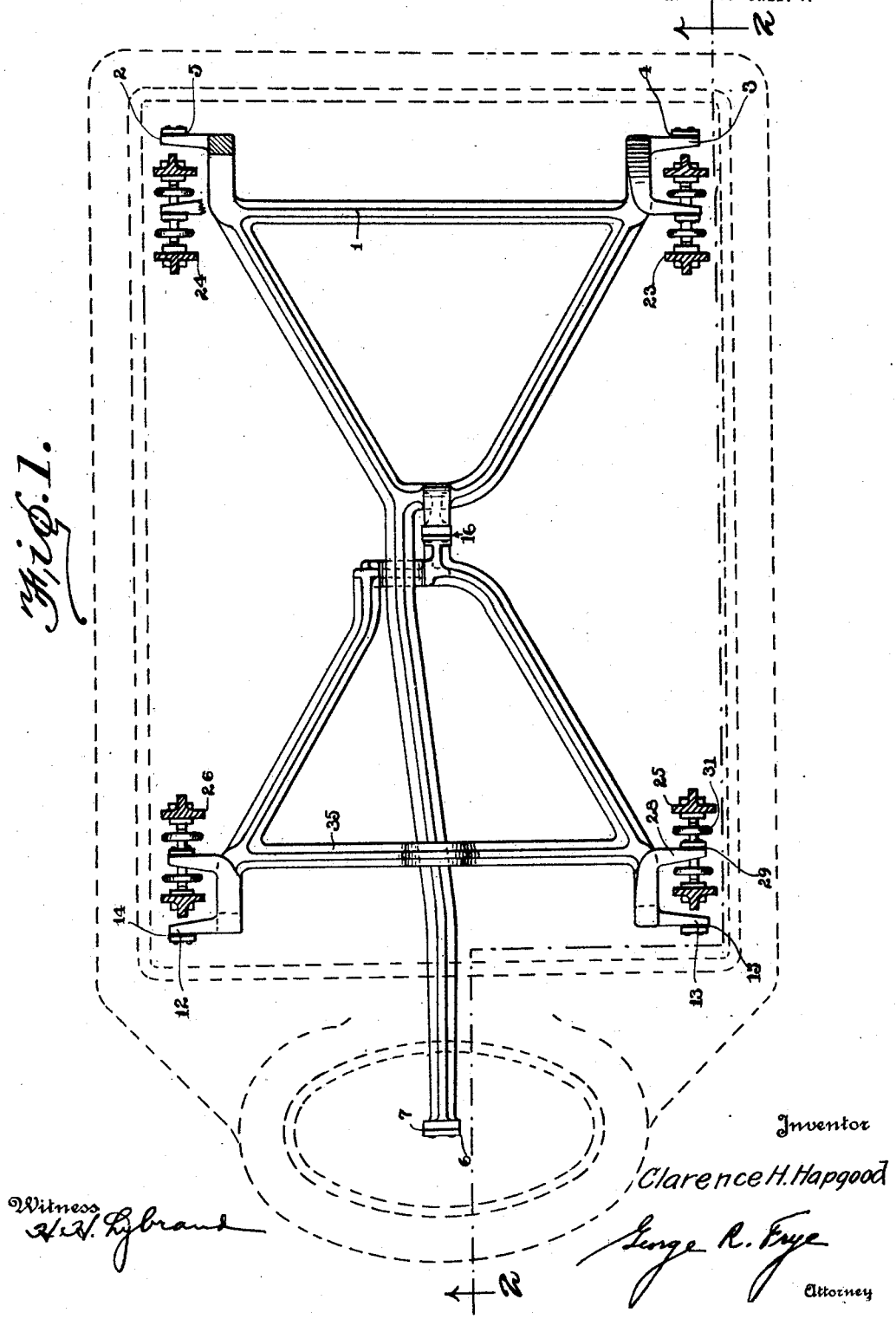

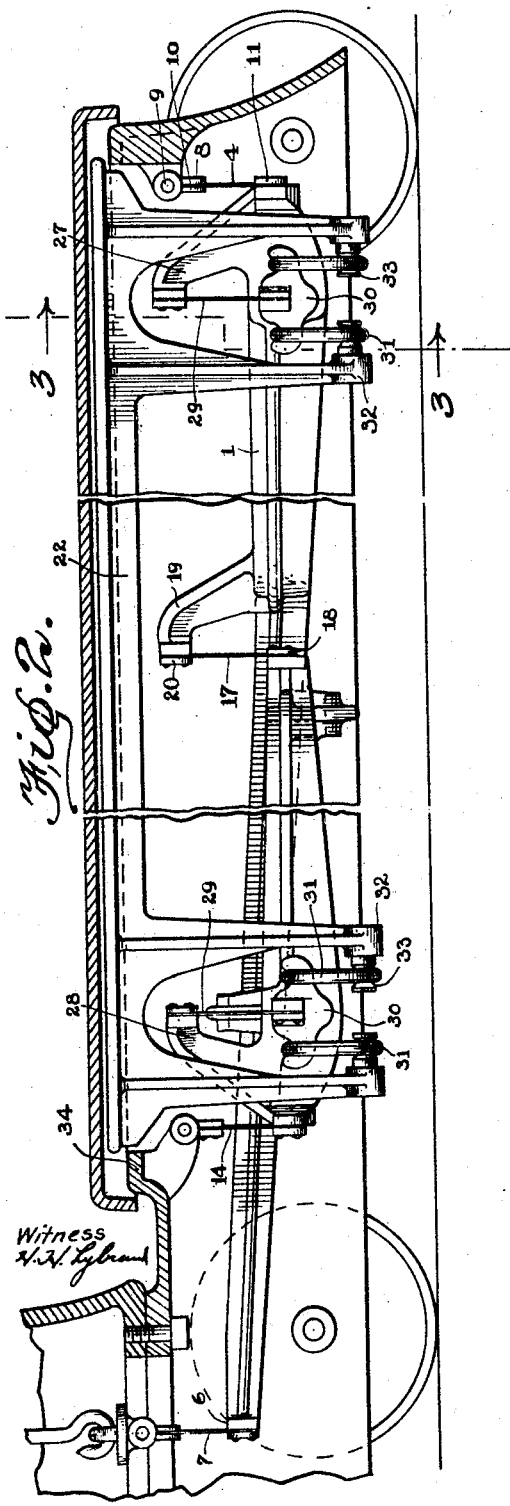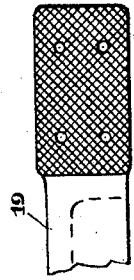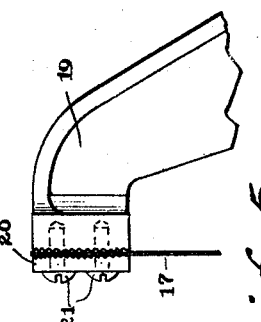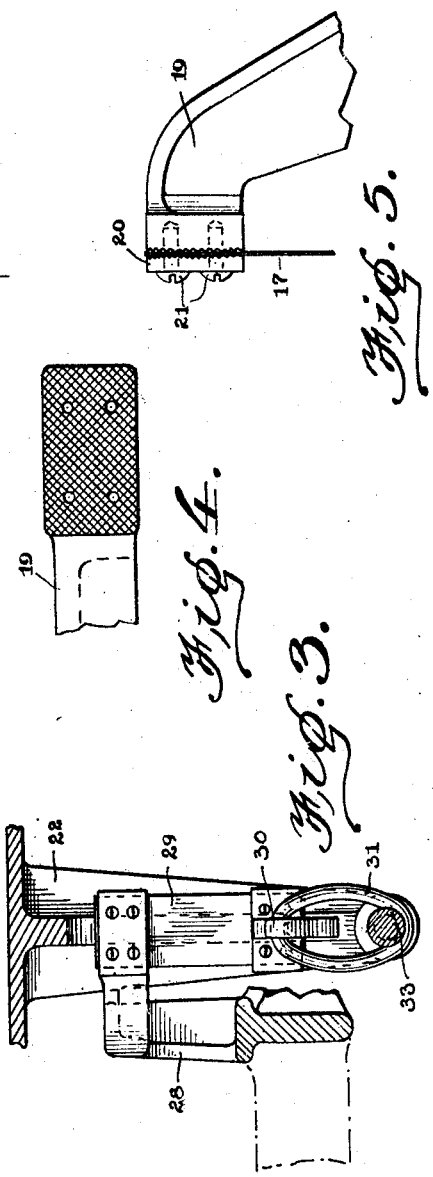

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

WEIGHING SCALE.

1,411,211.  Specification of Letters Patent.  Patented Mar. 28, 1922.

Application filed January 26, 1920. Serial No. 354,050.

*To all whom it may concern:*

Be it known that I, CLARENCE H. HAPGOOD, a citizen of the United States, residing at Toledo, in the county of Lucas and State of Ohio, have invented certain new and useful Improvements in Weighing Scales, of which the following is a specification.

My invention is intended to provide an arrangement for suspending a scale beam from its support or a scale platform, bucket, or the like from the scale beam, which will take the place of the knife edge suspension commonly employed heretofore and will be free from the disadvantages now attendant upon the use of such knife edges and result in diminished wear and friction, less liability to displacement from the true weighing position, and in diminishing the influence of accumulated dust and dirt.

My invention briefly described consists in the use of one or more flexible strips or laminae each connected at one end to the scale beam and at the other end to the part which supports or is supported by the beam, together with the use of a system of double links between the lower end of the flexible strips or laminae which support the platform from the scale beam and the point of attachment to said platform, the whole forming such a flexible support for the beam and the platform as to prevent the motion of the platform resulting from the placing on or removal from the platform of the objects to be weighed from distorting the flexible strips used as the means of support.

In the accompanying drawings:—

Figure 1 is a plan of the platform supporting levers of a scale equipped with my invention, the base and platform being indicated by dotted lines thereon;

Figure 2 is a side view in partial section of the base, platform and levers thereof;

Figure 3 is a detail sectional view on the line 3—3 of Figure 2, showing the platform-supporting member in elevation; and Figures 4 and 5 are detail views on a larger scale showing the method of clamping the flexible strips.

In the drawings there is shown the main long lever 1 supported at the points 2 and 3 by the flexible strips 4 and 5 and extending to the point 6 where by means of a similar flexible strip 7 the force produced by the weight of the levers, platform and article being weighed is transmitted to the weigh beam or other indicating mechanism of the scale, which may be of the ordinary type now used and in which no invention is claimed in this application. The flexible strips, as, for example, the strip 4 shown in Figure 2, is secured to a clamping plate 8 pivotally supported, as at 9, from the base of the machine. The flexible strip is attached to said clamping plate through the medium of a co-operating clamping plate 10 bolted to the clamping plate 8, the construction being similar to that indicated in Figures 4 and 5, which, however, illustrate the exact construction of a flexible strip and connection used in another part of the scale, as later pointed out. The lower end of the strip 4 is rigidly secured to the lever 1 by means of a clamping plate 11 similarly attached by bolts to said lever 1. A short lever 35 is supported at the points 12 and 13 by flexible strips 14 and 15 in an exactly similar manner to that described for the long lever 1, and at its opposite extremity is supported from the long lever 1 at the point 16 (see Figure 1) by means of a flexible strip 17 clamped between the short lever and a clamping plate 18 at its lower end and attached at its upper end to an arm 19 projecting upward from the long lever 1 (see Figure 2), said flexible strip 17 being attached to the arm 19 by means of a clamping plate 20 and suitable bolts or screws 21. In order to secure as firm a hold as possible upon the ribbons, the surfaces of the various castings and clamping plates are roughened, as shown in Figure 4.

The platform spider 22 is supported from the main long lever 1 at the points 23 and 24 and from the main short lever 2 at the points 25 and 26. At the points 23 and 24 arms 27 project upward and outward from the main lever, and similar arms 28 project upward and outward from the short lever 2. Secured to each of said arms 27 and 28 in a similar manner to that previously described and projecting downward therefrom are flexible strips 29 and to the lower end of each of these flexible strips 29 is clamped a yoke 30. Said yoke 30 consists of two projecting horns adapted to receive and retain the upper ends of links 31. U-shaped supporting members 32 project downwardly to points adjacent to the lower ends of the links 31 and in the lower ends thereof are inserted knobs 33 adapted to register with and be supported by said lower ends of the links 31, said construction being clearly shown in Figures 2 and 3. The platform of the scale is placed upon the spider 22 and suitably secured thereto.

The supporting flexible strips illustrated and described are in all cases firmly secured to the various parts with which they contact, and since these strips are very much wider in a direction at right angles to the center line of the scale than in a direction parallel thereto, it is obvious that they will provide flexibility only in a direction parallel to the center line of the scale, while in the opposite direction they will be comparatively rigid. Complete flexibility, however, in a direction at right angles to the center line of the scale is afforded by the suspension of the platform on knobs 33, links 31, and yokes 30, since said links are adapted to move in any direction upon the members with which they are in contact, and the platform can therefore move in any direction in which it may be forced in use without tending to cause any distortion of the flexible strips by which it is supported, its extreme movement being regulated by the clearance provided between the spider 22 and the base 34 of the scale.

While it will be apparent that the illustrated embodiment of the scale herein illustrated is well adapted to adequately fulfill the objects primarily stated, it is to be understood that the invention is susceptible to variation, modification and change without departing from the spirit and scope of the invention as set forth in the subjoined claims.

Having described my invention, I claim:

1. In a weighing scale and in combination with the indicating device, a scale frame, platform levers, flexible strips in tension supporting said platform levers from said scale frame, a platform, flexible strips in tension in series with freely movable links, and supporting connections between said strips, links and platform.

2. In a weighing scale and in combination with an indicating device, a scale frame, platform levers, means consisting of flexible strips in tension supporting said platform levers, a platform, and means supporting said platform from said platform levers consisting of flexible strips in tension, freely movable links and connections uniting said links, strips and platform.

3. In a weighing scale and in combination with an indicating device, a scale frame, platform levers supported thereon, a platform, and means for supporting the same from said platform levers consisting at each point of support of a flexible strip in tension, a pair of links, means pivotally connecting said links to said supporting strip and means pivotally connecting said links to said platform.

4. In a weighing scale, supporting members consisting of flat flexible strips under tension adapted to give flexibility in one direction only and serially connected with a linkage system having universal flexibility.

5. In a weighing scale, in combination, a frame, a member pivotally mounted thereon, a flexible member carried by said pivotally-mounted member, said flexible member being bendable in a plane perpendicular to the pivotal axis of said pivotally-mounted member, and a lever suspended by said flexible member.

6. In a weighing scale, in combination, a lever, a flexible member connected thereto, a yoke carried by said flexible member, a platform, and suspension links supporting said platform from said yoke.

7. In a weighing scale, in combination, a lever, an upwardly-projecting arm thereon, a flexible member depending from said arm, and platform-supporting means carried by said flexible member.

8. In a weighing scale, in combination, a lever, an upwardly-projecting arm thereon, a flexible member depending from said arm, link suspension means connected to said flexible member, and platform-supporting means carried by said link suspension means.

9. In a weighing scale, in combination, a lever, an upwardly-projecting arm thereon, a flexible member depending from said arm, a yoke connected to said flexible member, links carried by said yoke, and platform-supporting means carried by said links.

10. In a weighing scale, in combination, platform levers, flexible members connected to said platform levers, links connected to said flexible members, a platform spider, downwardly-extending projections on said platform spider, and laterally-extending members on said projections, said laterally-extending members being carried by said links.

11. In a weighing scale, in combination, platform levers, upwardly-extending arms on said levers, flexible members depending from said arms, links connected to said flexible members, a platform spider, downwardly-extending projections on said platform spider, and laterally-extending members on said projections, said laterally-extending members being carried by said links.

12. In a weighing scale, in combination, a main lever, an upwardly-extending arm on said lever, a flexible member depending from said arm, and an auxiliary lever connected to said flexible member.

13. In a weighing scale, in combination, a main lever, an auxiliary lever, upwardly-extending arms on said main lever, and flexible members depending from said arms, said auxiliary lever being connected to one of said members, and a platform spider connected to the others of said flexible members and to said auxiliary lever.

14. In a weighing scale, in combination, a main lever, an auxiliary lever, upwardly-extending arms on said main lever, and flexible members depending from said arms, said auxiliary lever being connected to one of said members, a platform spider connected to the others of said members, upwardly-extending arms on said auxiliary lever, and flexible members depending from the last said arms, said platform spider being also connected to the last said flexible members.

15. In a weighing scale, in combination, a frame, flexible lever supports depending from said frame, a main and an auxiliary platform lever connected to said flexible lever supports, upwardly-extending arms on said main platform lever, and flexible members depending from said arms, said auxiliary lever being connected to one of said flexible members, a platform support connected to the others of said flexible members, upwardly-extending arms on said auxiliary lever, and flexible members depending therefrom, said platform support being also connected to the last-mentioned flexible members.

CLARENCE H. HAPGOOD.

Witness:
C. O. MARSHALL.